United States Patent [19]
Krofta

[11] Patent Number: 5,863,441
[45] Date of Patent: Jan. 26, 1999

[54] THREE ZONE DISSOLVED AIR FLOTATION CLARIFIER WITH IMPROVED EFFICIENCY

[75] Inventor: Milos Krofta, Lenox, Mass.

[73] Assignee: Lenox Institute of Water Technology, Inc., Lenox, Mass.

[21] Appl. No.: 44,753

[22] Filed: Mar. 19, 1998

Related U.S. Application Data

[62] Division of Ser. No. 638,116, Apr. 26, 1996.

[51] Int. Cl.$^6$ ........................................................ C02F 1/24
[52] U.S. Cl. .......................... 210/703; 210/712; 210/802; 210/805; 210/221.2; 210/521; 210/522
[58] Field of Search ..................................... 210/703, 712, 210/802, 805, 221.2, 521, 522

[56] References Cited

U.S. PATENT DOCUMENTS

| | | |
|---|---|---|
| 2,324,400 | 7/1943 | Kelly . |
| 2,679,477 | 5/1954 | Kivari . |
| 2,695,710 | 11/1954 | Gibbs . |
| 2,713,026 | 7/1955 | Kelly . |
| 2,874,842 | 2/1959 | Krofta . |
| 2,876,863 | 3/1959 | Kivari . |
| 3,182,799 | 5/1965 | Krofta . |
| 3,246,763 | 4/1966 | Baum . |
| 3,542,675 | 11/1970 | Mail . |
| 3,794,171 | 2/1974 | Kimura . |
| 4,022,696 | 5/1977 | Krofta . |
| 4,043,912 | 8/1977 | Bascope . |
| 4,082,671 | 4/1978 | Kelly . |
| 4,184,967 | 1/1980 | Krofta . |
| 4,377,485 | 3/1983 | Krofta . |
| 4,450,072 | 5/1984 | Suplicki . |
| 4,626,345 | 12/1986 | Krofta . |
| 4,931,175 | 6/1990 | Krofta . |
| 5,268,099 | 12/1993 | Krofta et al. . |
| 5,296,149 | 3/1994 | Krofta . |
| 5,306,422 | 4/1994 | Krofta . |
| 5,320,750 | 6/1994 | Krofta . |
| 5,415,771 | 5/1995 | Krofta . |

FOREIGN PATENT DOCUMENTS

| | | |
|---|---|---|
| 1340793 | 9/1987 | U.S.S.R. . |
| 1565812 | 5/1990 | U.S.S.R. . |

Primary Examiner—Thomas M. Lithgow
Attorney, Agent, or Firm—Peter J. Manus

[57] ABSTRACT

A compact dissolved-air-flotation (DAF) clarifier and clarification process utilize three zones for clarification which operate in sequence in a single clarifier. Raw water with suspended solids enters a flocculator at the center of an annular tank where microscopic air bubbles introduced to the inflow float flocked contaminants to form a floating sludge layer. A first clarification, calming and degassing occur here. The water then flows radially outwardly into the tank where further quiet clarification occurs. A third level of clarification occurs in a lower portion of the tank, specifically, in a set of plate-like lamellae, radial and conical, which form inclined channels where a final clarification occurs. The bottom wall of the tank has a set of apertures which allow a gravity flow of clarified water through a layer of pressurized gas to an underlying collection compartment. Level sensors control a valve in the clarified outflow line and an air bleed from the pressurized gas layer to regulate liquid levels in the clarifier. A set of rotating paddles push the sludge layer up a ramp to an inclined discharge conduit. Alternatively, a suction head with a mechanical skimmer sweeps around the tank to draw the sludge through a central hollow pipe to a discharge conduit. An offset drive operating through a belt rotates the sludge removal mechanism and the lamellae.

10 Claims, 5 Drawing Sheets

THREE ZONE DISSOLVED AIR FLOTATION CLARIFIER WITH IMPROVED EFFICIENCY

REFERENCE TO RELATED APPLICATIONS

This is a Divisional Application of Ser. No. 08/638,116, filed Apr. 26, 1996.

BACKGROUND OF THE INVENTION

This invention relates in general to an apparatus and method for the clarification of water where the removal of suspended particles is accomplished by a flocculating agent and flotation using a stream of rising, microscopic air bubbles. More specifically, it relates to apparatus and a process for dissolved air flotation clarification using multiple sequential zones of clarification, clarified water removal through an air pocket, and improved removal of floated sludge.

Water clarification, the removal of particulate contaminants suspended in water, is used to treat waste water from manufacturing processes, particularly in the paper and pulp industries, in the treatment of municipal water drinking supplies, and in sewage treatment. The water can be clarified by sedimentation or flotation of the particles. Known sedimentation techniques and apparatus are efficient, but are limited even at peak efficiency to a comparatively slow sedimentation rate, about 0.5 gallons per minute per square foot (20 liters/min/m$^2$). To handle large volumes of raw input water, sedimentation facilities must therefore be large, with attendant cost and space utilization disadvantages. Also, sedimentation tanks are typically much deeper than tanks for flotation clarification and the sludge removed has a lower solids content than with flotation clarification.

Flotation techniques dissolve a few percent of air by volume in pressurized water and then release the air in the form of microscopic bubbles which attach to the particles and carry them upwardly to the surface where they form a floating sludge. This general type of clarification is sometimes termed dissolved air flotation or "DAF". The particles are usually coagulated and flocculated using conventional agents such as alum and/or polymers before the air bubbles are introduced. Flotation techniques are theoretically capable of achieving clarification rates of 7.5 gallons per minute per square foot (GPM/SQFT) of flotation area (300 l/m$^2$/min). Heretofore in practice the rates have been less than this theoretical value, but significantly better than for sedimentation techniques.

Several early attempts by applicant to use flotation techniques to clarify water are described in U.S. Pat. No. 2,874,842 issued in 1959 and U.S. Pat. No. 3,182,799 issued in 1965. They used a stationary tank with no skimmers or other moving components in the tank. The gas bubbles were introduced via the main raw water inlet and guided within the tank by an internal deflector ('842) or a stack of internal baffles ('799). Because the gas bubbles were guided by stationary components, there was no design problem created by the turbulence of moving part in the flotation tank. Also, these devices did not lend themselves to treatment at high flow rates. The '799 apparatus had the additional problems in that (i) the inlet water had to be separately fed from the side to the region between each adjacent pair of baffles and (ii) the flow paths for floated particles varies depending on the vertical position of the associated baffles defining the flow path. This latter situation means that the apparatus either does not fully treat the inlet water, or is slow.

Applicant holds several other U.S. patents for water clarification apparatus and processes, including U.S. Pat. Nos. 4,022,696; 4,377,485; 4,626,345; 4,184,967;and 4,931,175, all of which greatly improve over the performance of the early'842 and '799 devices. In the '696 clarifier, which continues to be sold under the trade designations "SPC" and "Supracell", the flotation occurs in a circular tank. The raw water is fed into the tank via a central pipe, a hydraulic joint, and an inlet pipe with multiple outlets immersed in the tank which rotates about the tank. The inlet flow is oriented opposite to the direction of rotation of the inlet pipe and is at a velocity with respect to the rotation rate such that the raw water has a net zero velocity as it enters the tank. The raw water inlet flow assembly and a scoop for removing the floated sludge are mounted on a heavy carriage driven to rotate about the tank. The scoop is preferably a multi-bladed one of the type described in applicant's U.S. Pat. No. 4,184,967. It has a motor mounted on the carriage to rotate the scoop. The rate of rotation of the carriage about the tank is set so that the floated particles will reach the surface of the water held in the tank in the time of one rotation. A good degree of clarification can be achieved with each rotation of the carriage using a comparatively shallow tank, e.g., 16–18inches. This SPC unit clarifies at a rate of about 130 liters/m$^2$/min (3.25 gal/min./sq.ft.). This is much better than the rate using sedimentation techniques, but less than half of the theoretical maximum rate.

In the "Supracell" and the other clarifiers described in the aforementioned patents, there are common design features and limitations. For one, the flotation of the flocked particles is generally vertical (or follows inclined conical plates), and is in a body of water that is comparatively shallow and generally free from turbulence. Second, in all of these designs the removal of the floated sludge is by a bladed, rotating scoop feeding an inclined discharge pipe. Third, in each design clarified water is collected by pipes or hollow headers with inlet apertures. The pipes are stationary or rotating in the water at the bottom of the tank. In units using a second filtration stage, e.g. a bed of sand at the bottom of the clarification tank, the pipes can be embedded in the sand bed. Also, heretofore, in order to increase the capacity of a given type of clarifier, one built a larger diameter tank. While in theory one can build a large enough tank to accommodate any clarification load, cost and space constraints have provided practical limitations on the capacities of these units.

More recent approaches to increasing clarification capacity, while retaining physical compactness and a competitive cost of manufacture and operation, are described in U.S. Pat. Nos. 5,268,099; 5,296,149; 5,320,750; 5,415,771; and 5,306,422, all to the present applicant as sole or joint inventor. The '149 patent describes a clarification sold under the trade designation "SPC-L" as an improvement over the '696"Supracell" brand clarifier, as well as the '175 conical plate or "SPC-P" clarifier. The SPC-L clarifier substantially fills a shallow tank with intersecting radial and conical concentric plate-like lamellae. They form an annular array of inclined, open-ended channels which each lock and transport a column of water to be treated. The lamellae rotate slowly in a tank between a fixed raw water distribution header and a fixed clarified water withdrawal header. Rotation of the lamellae hydraulically couple a floated sludge layer to rotate the sludge onto a ramp-like lip of a fixed, hollow sludge skimmer. A screw conveyor mounted within the skimmer rotates to advance the collected sludge radially across the clarifier tank to a discharge pipe. This clarifier operates with one stage in a shallow tank that is substantially filled with the lamellae.

U.S. Pat. No. 5,306,422 describes a clarifier using a double stack of DAF clarifiers where the output of the upper clarifier is fed to the lower clarifier for further clarification. Clarification occurs sequentially in two separate clarifiers with the output of one clarifier fed by gravity to the underlying clarifier in the stack.

U.S. Pat. No. 5,415,771 describes a high capacity clarifier with a single large diameter tank that is divided into multiple sectors by rotating raw water distribution headers and associated clarified water collection headers. Rotating bladed scoops associated with each of these plural header sets remove the floated sludge. Again, clarification occurs in a single stage in a single shallow tank.

U.S. Pat. No. 5,320,750 described an improvement on the '345 clarifier (sold under the trade designation "SASF") which has a central flocculator with a spill-over feed to a surrounding DAF clarification tank with a filter media, such as sand, located at the bottom of the tank. This '750 clarifier, sold under the trade designation "SAF-BP", isolates the first filtrate and uses it to backwash the sand bed sector-by-sector. Clarified water is collected via a network of apertured pipes embedded in the sand layer. Floated sludge is removed by a rotating bladed scoop. The patent also discloses a valve, sold under the trade designation "KD", that introduces air bubbles to the treated water in the central flocculator.

The '696 "Supracell" brand clarifier first introduced in the 1970's continues to be a standard, well-received product for many applications. There remains, however, a need for a compact, non-filtering clarifier which offers performance, maintenance and cost advantages over the "Supracell" clarifier.

It is a principal object of this invention to provide a DAF-type clarifier and process with an enhanced clarification efficiency and capacity as compared to a comparably-sized "Supracell" clarifier.

A further principal object is to provide a sludge removal apparatus and method which avoids the use of rotating bladed scoops and carriages that rotate around the tank to transport the scoop, and, in some instances, also to introduce treated water to a clarification tank.

Another principal object is to provide the foregoing advantages while reducing power consumption as compared to a comparably-sized "Supracell" clarifier.

Another object is to provide a clarifier with the foregoing advantages which can be enclosed.

Still another object is to provide such a clarifier which is also compact.

A further object is to provide a clarifier with the foregoing advantages which has a favorable cost of manufacture.

SUMMARY OF THE INVENTION

A dissolved air flotation (DAF) type clarifier has a central flocculator which receives raw water treated with a flocculating agent from an inlet pipe. A stream of recycled water with dissolved air is separately introduced into the flocculator to produce a stream of microscopic air bubbles. Interaction of the flocculating agent and the air bubbles in the flocculator produces a first clarification, a degassing and a calming of the treated raw water as the particulate flock and are carried upwardly to the surface of the water. The flocculator defines a clarification zone I.

An annular tank or "ring" surrounds the flocculator. Openings in the side wall of the flocculator direct the treated water radially outwardly to an upper portion of the tank. The flocculator side wall isolates clarification in the tank from the turbulence in the flocculator produced by the raw water inlet flow and the introduction of the air bubbles. This turbulence dissipates in the flocculator, which can be viewed as calming the mix of inflows. A "quiet" DAF clarification occurs in this upper portion of the tank defining a clarification zone II. Flocked particulates are carried by air bubbles to the upper surface of the tank, which is preferably the same level as over the flocculator.

Further slow clarification occurs in a zone III defined by a set of intersecting concentric conical and flat radial lamellae that substantially fill the lower portion of the tank. The lamellae are preferably formed of plastic and supported to rotate within the tank about its center. The lamellae together produce an array of inclined, open-ended channels which transport a column of treated water with substantially no turbulence within the column despite the rotation. Flocked particulates floated within the channels rise through zone II to a floated sludge layer formed by clarification in all three zones. Coarse particles settle to the bottom of the tank where they are continuously scraped into a sump by a bottom scraper mounted on the bottom of rotating lamellae ring.

The tank has a bottom wall perforated by small, generally uniformly spaced holes which allow the removal of clarified water from the bottom of the tank, adjacent the lower end of the lamellae. A bottom plate and side walls define a clarified water collection compartment immediately below the apertured bottom wall. A source of pressurized gas creates a shallow gas layer or pocket that extends under the aperture bottom wall. Clarified water falls through the holes into the pressurized gas pocket to collect in the compartment and be withdrawn via a clarified water outlet pipe. A level sensor detects the level of the collected clarified water and adjust the level by controlling an air bleed valve to increase or reduce the air pressure in the compartment.

To remove the sludge layer, one or more paddles mounted and rotated over the tank on support arms sweep the sludge up a fixed ramp and into an inclined discharge conduit that extends radially over the tank. The paddle is preferably a set of multiple, equiangularly spaced paddles that are each flexible to accommodate passage over the ramp despite being secured on a rigid arm. Preferably the paddles are driven in unison with the lamellae by a motor mounted at the periphery of the tank and coupled to the rotating members via a variable gear transmission, a tensioned timing belt, and a movable cylindrical wall that separates the flocculator from the tank. Alternatively, the sludge is skimmed and sucked from the tank by a rotating vacuum head disposed over the tank and connected to a positive vacuum pump and a sludge discharge conduit via a rotary joint. Rotation of the sludge layer and the generally radially outward flow of the water near the top of the tank move sludge from a position over the flocculator to a position over the tank where the paddles or suction head remove it.

Viewed as a process, the invention includes the sequential clarification of raw water treated with a flocculating agent in (i) a flocculation zone where dissolved air is released to form microscopic air bubbles, (ii) an upper portion of an annular tank adjacent the flocculator, and (iii) a set of inclined, open-ended channels in a lower-part of the annular tank. Turbulence in the flocculator is isolated from the following clarifications. The invention also includes gravity withdrawal of clarified water from the bottom of the tank through a layer of pressurized air. The invention also includes collecting the clarified water, monitoring its level, and adjusting the outflow of the clarified water and the compressed air to maintain a pre-set water levels in the clarifier. To remove the sludge layer, the invention includes the steps of sweeping the sludge up a ramp into a collection receptacle, or mechanically skimming and sucking it from the tank.

These and other features are objects of the invention will be more fully understood from the following detailed description which should be read in light of the accompanying drawings.

DETAILED DESCRIPTION OF THE PREFERRED EMBODIMENTS

Figure 1:
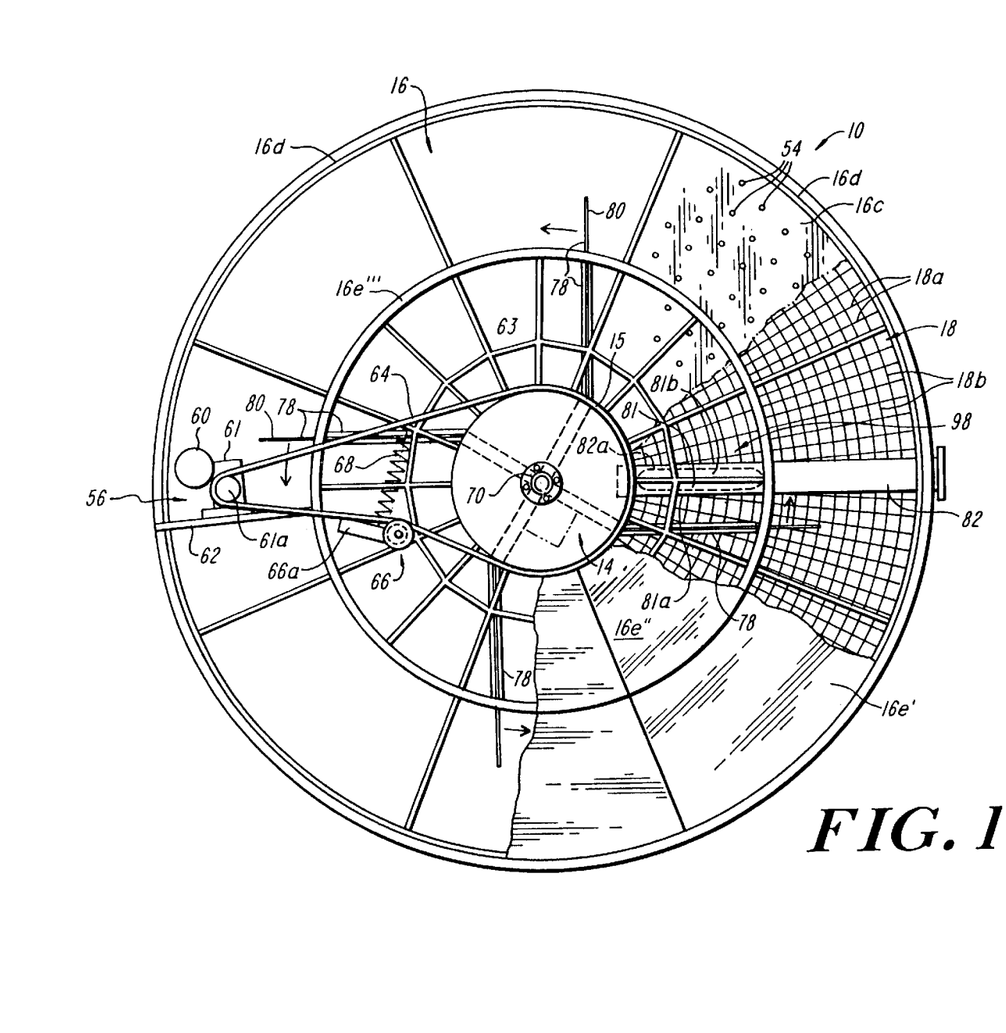
FIG. 1 is a top view of a DAF clarifier according to the present invention, with portions broken away.
Figure 2:
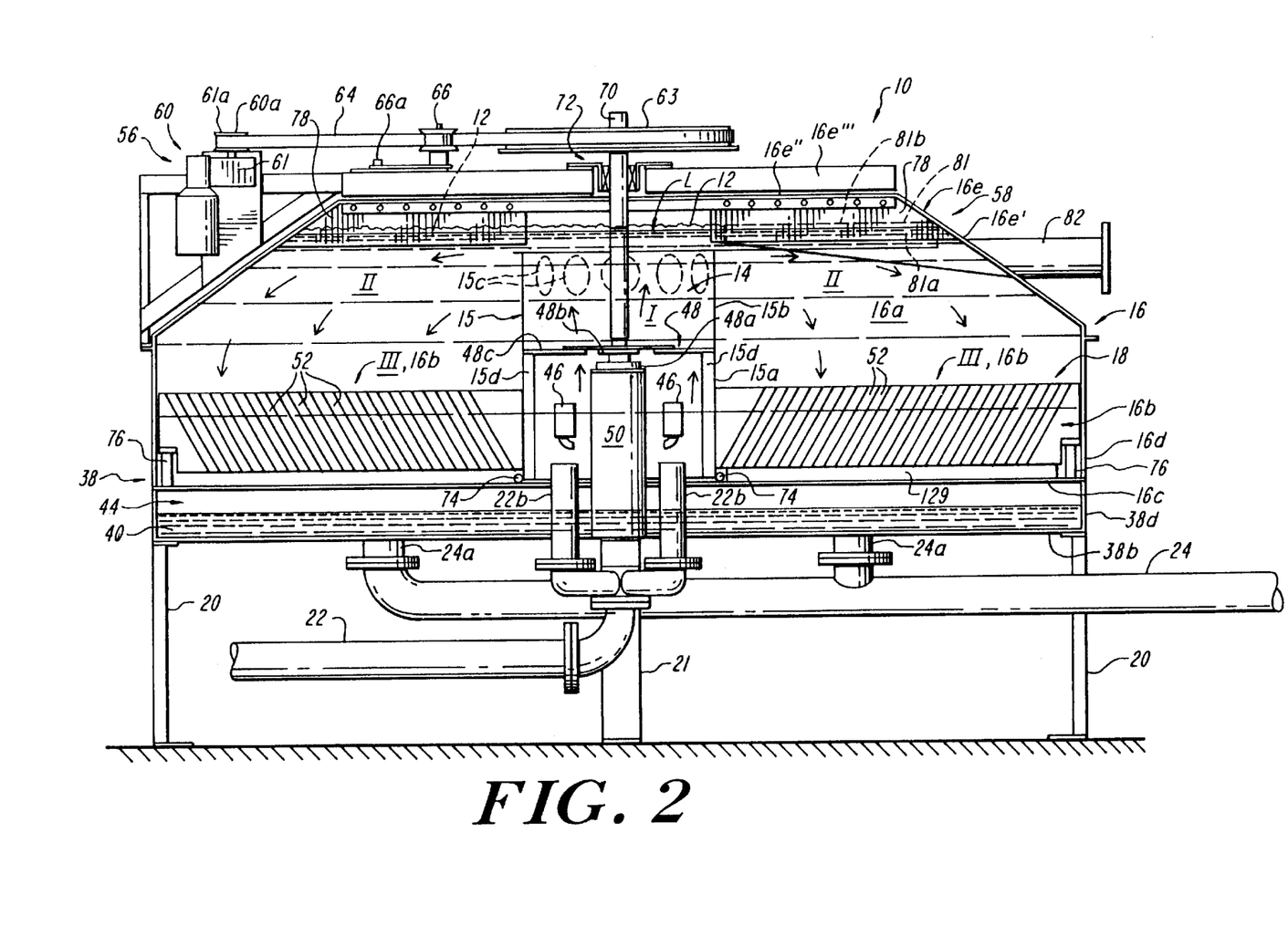
FIG. 2 is a view in vertical section along the line 2—2 of the clarifier shown in FIG. 1.

FIGS. 1–5 show a dissolved air flotation (DAF) type clarifier 10, 10' that removes suspended particulate contaminants from a liquid, particularly water, as a layer 12 of floated sludge. The clarifier 10 in FIGS. 1 and 2 is the same as the clarifier 10' in FIGS. 3 and 4 except for the sludge removal apparatus and method. Like parts in the different embodiments are marked with the same reference number. For convenience, the invention will be described with reference to clarifying raw water, but it will be understood that "water" includes a variety liquids, and in particular, petroleum and other chemicals, some of which are ordinarily considered flammable or explosive. The present invention is particularly useful where the incoming suspended solids are below 3 grams/liter (3,000 ppm). Raw treated water means unclarified water which has had a flocculating agent added to it, or a flocculating agent and microscopic air bubbles to produce the flotation.

The clarifiers 10, 10' are generally cylindrical with a central flocculator 14, defined by a rotatable cylindrical side wall 15, and surrounding, generally annular or ring-shaped tank 16 with an upper portion 16a and a lower portion 16b. A set of intersecting radial (18a) and concentric conical (18b) plate-like lamellae 18 substantially fill the lower tank portion 16b. The lamellae 18 are preferably formed of a plastic material for low weight, corrosion resistance, ease of cleaning, and cost. The construction and operation of the lamellae are described in detail in U.S. Pat. No. 5,296,149, the disclosure of which is incorporated herein by reference. The tank 16 has a bottom wall 16c, a cylindrical side wall 16d, and a cover assembly 16e with a truncated conical portion 16e', a flat central portion 16e", and a mounting flange 16e'''.

Figure 4:
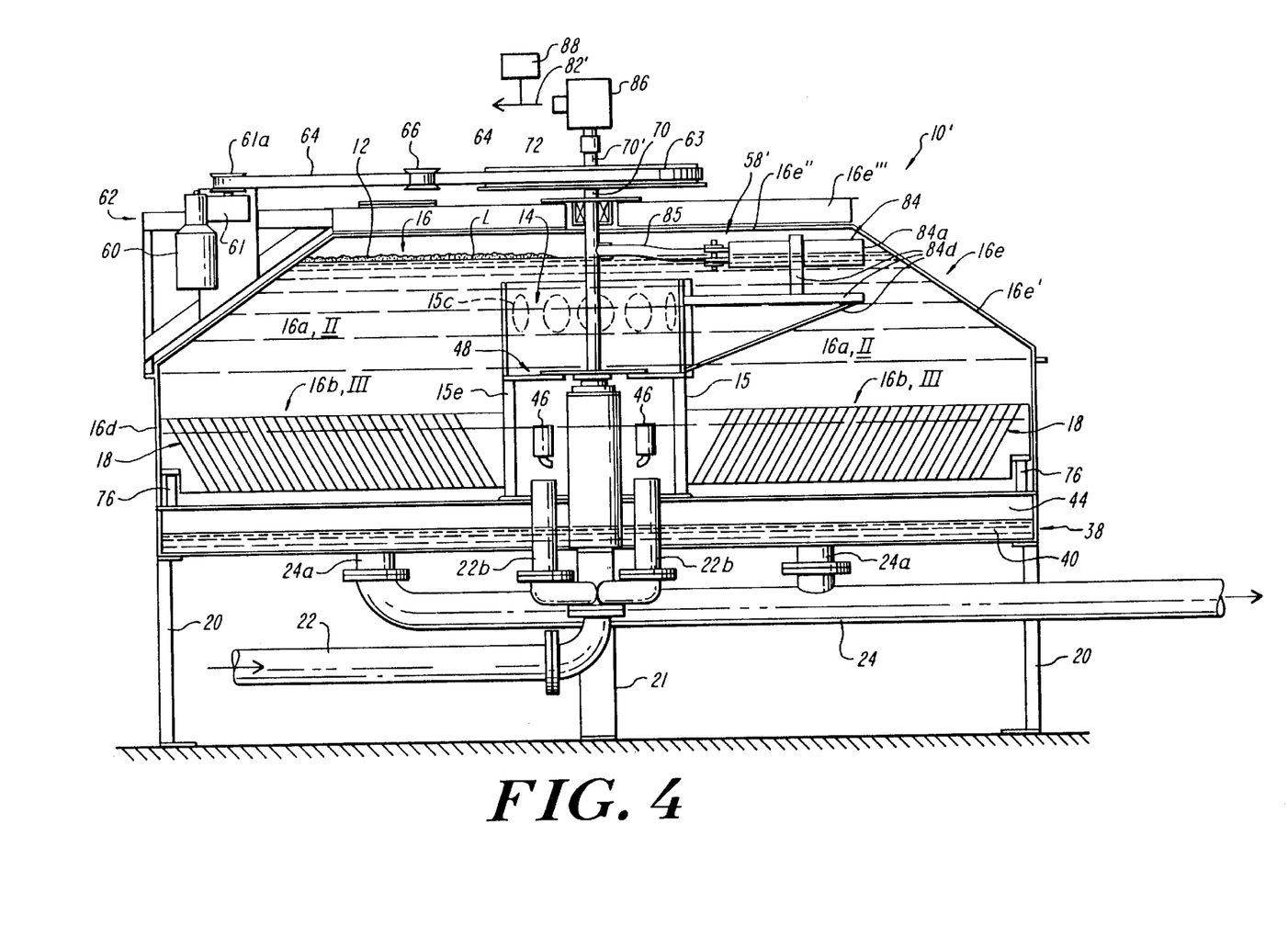
FIG. 4 is a view in vertical section along line 4—4 of the clarifier shown in FIG. 3.
Figure 5:
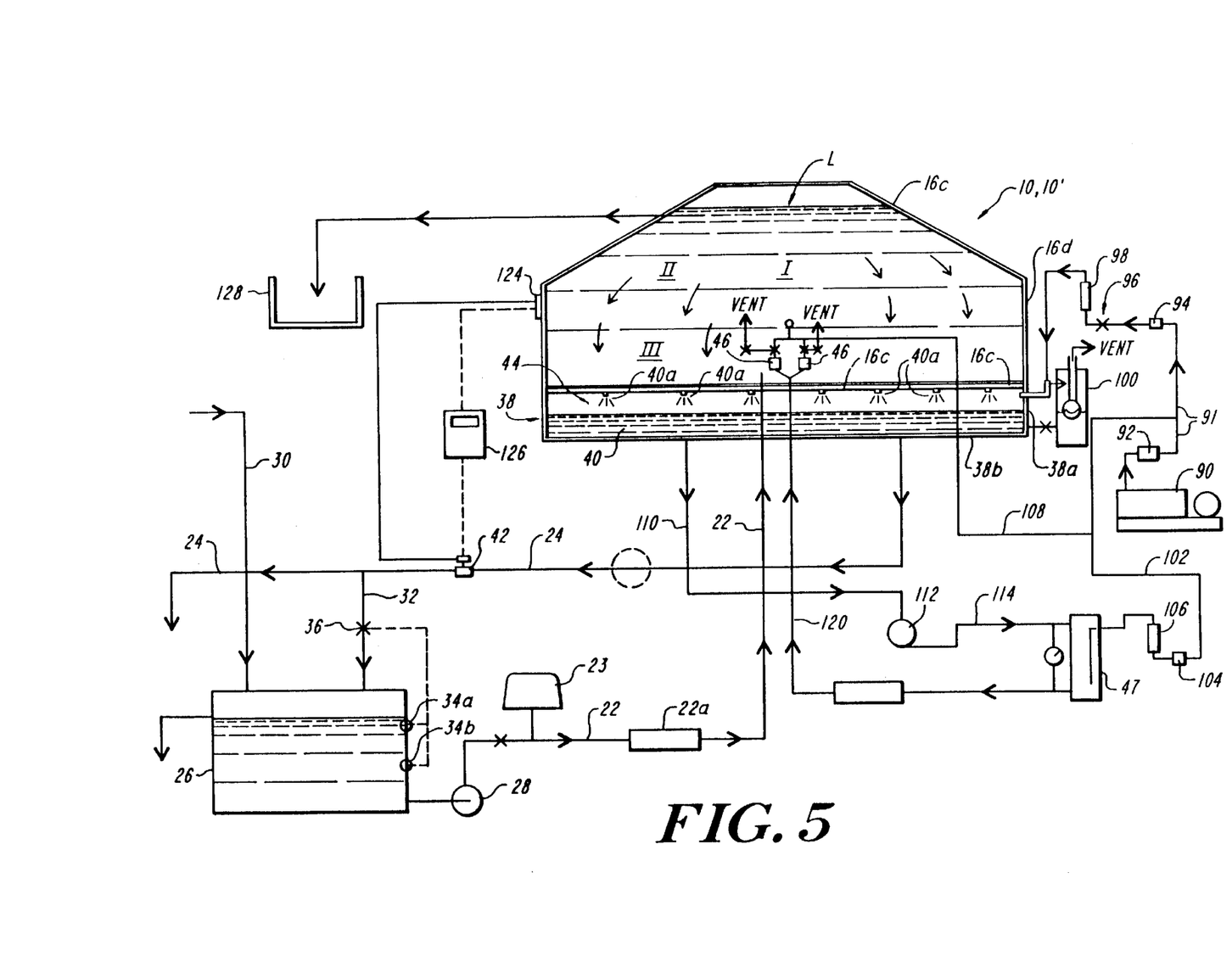
FIG. 5 is a schematic illustration of a fluid control system for the clarifier.

With particular reference to FIGS. 2, 4, and 5, the clarifier 10, 10' is supported on a set of legs 20 arranged equiangularly about its periphery and a central support 21. The legs 20 and support 21 provide clearance for a main inlet pipe 24 carrying raw water to be clarified and an outlet pipe 24 for clarified water. The raw water entering the clarifier has had a conventional flocculating agent, such as alum or a polymer, added to it, as shown schematically at 23 in FIG. 5. A flowmeter 22a measure the inlet flow rate of raw, treated water from a holding tank 26 propelled by a pump 28. Water in the tank 26 includes raw water from line 30 and recycled clarified water diverted from pipe 24 via line 32. Level control in the tank 26 is provided by level sensors 34a, 34b which control the operation of valve 36 in the line 32.

Raw water feed terminates at the tank 16 in a set of four branched inlets 22b, that each extend vertically, with mutually equiangular spacing, into the flocculator 14 at its lower end.

Clarified water is removed via a clarified collection compartment 38 which is generally coextensive with, and sealed to the bottom of, the tank bottom wall 16c. The compartment 38 includes a generally cylindrical side wall 38a, and a generally flat, solid bottom wall 38b. The clarifier 10, 10' can be viewed as having a double bottom wall with bottom wall 16c being a "false" perforated bottom wall. Clarified water 40 collects in the compartment and drains to the pipe 24 via four branch conduits 24a that are mutually equiangularly spaced around the tank and are in fluid communication between the compartment and the outlet pipe 24. An adjustable valve 42 in the pipe 24 controls the clarified water outlet flow rate and the water level L in the clarifier. As will be described in more detail hereinbelow, a principal feature of this invention is a pocket or layer 44 of pressurized gas that fills the compartment 38 between the bottom wall 16c and the collected clarified water 40.

The flocculator defines a zone I where a set of valves 46 release a stream of microscopic air bubbles from a supply of air dissolved under pressure in water produced in an air dissolving tube 47 (FIG. 5). The valves 46 can be of any conventional construction. The pneumatically operated valve sold by Krofta Engineering Corp. under the trade designation "KD" and described and shown in U.S. Pat. No. 5,320,750, the disclosure of which incorporated herein by reference, is preferred. The valves 46 are each positioned over one of the inlet branch conduits 22b. The microscopic air bubbles produced as the dissolved air is released from the valves are thoroughly mixed with the inflow of raw, treated water in the lower part of the flocculator, preferably below a lower support and bearing assembly 48, which in turn is rotatably mounted on a central base assembly column 50. As is well known, suspended solids in the raw treated water flock and the flocks attach to the air bubbles which causes the flocks to rise through the water to its surface where they form the floating sludge layer 12. Clarification begins in the flocculator; this first level of clarification in the flocculator is termed herein zone I. Degassing, that is, the release of gases dissolved in the water being treated, also occurs principally in zone I. The water which flows into the tank 16 carries with it a portion of the microscopic air bubbles sufficient to continue the DAF clarification in the tank.

The flocculator side wall 15a below the support assembly 48 is solid. It isolates turbulence at the inlet from flotation occurring in the outer tank 16a and 16b. This is important since turbulence interferes with the flotation process. The upper flocculator side wall 15b has a circumferentially extending series of openings 15c which provide a radially outward flow path for treated water from the upper region of the flocculator 14 to the tank 16. In addition, the wall 15 extends vertically so that in normal operation its upper edge lies slightly over the surface of the water in the tank 16. When there is high solids content in the raw water, sludge and foam build up on the surface of the water in the flocculator and overflow into the tank 16.

Clarification by dissolved air flotation continues sequentially in two additional zones in the tank 16. The partially clarified, degassed water in the upper region 16a of the tank 16 undergoes further clarification in the calmer, less turbulent, and larger surface area region also denoted herein as zone II. Again, the movable wall 15 substantially isolates this region from the turbulence in the flocculator. Suspended solids flock together and are carried up to the surface of the water. Water clarified in zone II flows downwardly toward the collection compartment 38 and pass into a zone III defined by the lower tank region 16b and the lamellae 18. In zone III, a slow, final DAF clarification occurs in an array of inclined, open-ended, channels 52 formed by the intersecting and interconnected lamellae 18a and 18b. As described in U.S. Pat. Nos. 4,931,175 and 5,296,149, the inclination of the conical, concentric lamellae 18b (shown in FIGS. 2 and 4) has the effect of increasing the length of the rise path of the flocked particles, and thereby increasing the efficiency of the clarification as compared to that achievable with a direct vertical path. Treated water exiting the top of the flocculator thus flows generally downwardly through zones II and III of the tank, becoming increasingly clarified as it proceeds toward the bottom wall 16c of the tank via the channels 52.

The lamellae 18 preferably rotate slowly within the tank, either continuously, or, to save power, intermittently. The rotation produces negligible turbulence in zone III because the water being clarified is locked in the channels 52 which are open only at their upper and lower ends. The rotation is desirable since it controls "channeling", that is, a particulate build up between the channel outlets at the lower edges of the lamellae and the bottom wall 16c.

The tank bottom wall 16c containing an array of small holes 54 preferably evenly spaced over the wall 16c. They provide an outlet for the clarified water from the tank 16 to the collection compartment 38. The flows of the clarified water through the holes 54 is shown as 40a in FIG. 5. These flows are through the pressurized gas layer 44. The water level is controlled to a constant value. The gas pressure is variable, as described in more detail below. Adjusting the control gas pressure regulates the outlet flow volume from the tank 16 in response to the sensed level of the collected clarified water 40 in the compartment 38 and in response to the processed water flow.

A drive assembly 56 rotates the lamellae, the wall 15, and a sludge removal assembly 58 in unison. The drive assembly includes a motor 60 and a driven gear box 61 mounted on a frame 62 which in turn is secured on the cover assembly 16e near the outer edge of the cover. The gear motor 60, 61 preferably incorporates a variable frequency controller, e.g. one which can vary the output speed over a 3:1 range. An output pulley 61a of the gear motor couples to a larger diameter pulley 63 via a timing belt 64. A tension adjuster 66 pivots about point 66a against the belt 64 biased by a spring 68 to maintain a reliable coupling between the belt and the pulleys 61a and 63. The pulley 63 is secured to a drive shaft 70 centered on the flocculator 14. The shaft 70 is supported in an upper support and bearing assembly 72 and the lower support and bearing assembly 48.

The lower assembly 48 includes a bearing unit 48a, a collar 48b secured to the shaft 70, and a spider of radial arms 48c coupled between the collar and the wall 15. This structure transfers rotary motion of the shaft 70 to the wall 15. Vertical stiffening flanges 15d strengthen the wall. A sliding seal 74 at the bottom of the wall 15 maintain an isolation of the flocculator and the tank despite the rotation. The lamellae are secured to the moving side wall at the inner edge of the radial lamellae 18a. Wheels 76 secured to selected radial lamellae 18a at their lower, outer ends supports the lamellae and allow them to roll freely over the bottom wall 16c.

Figure 3:
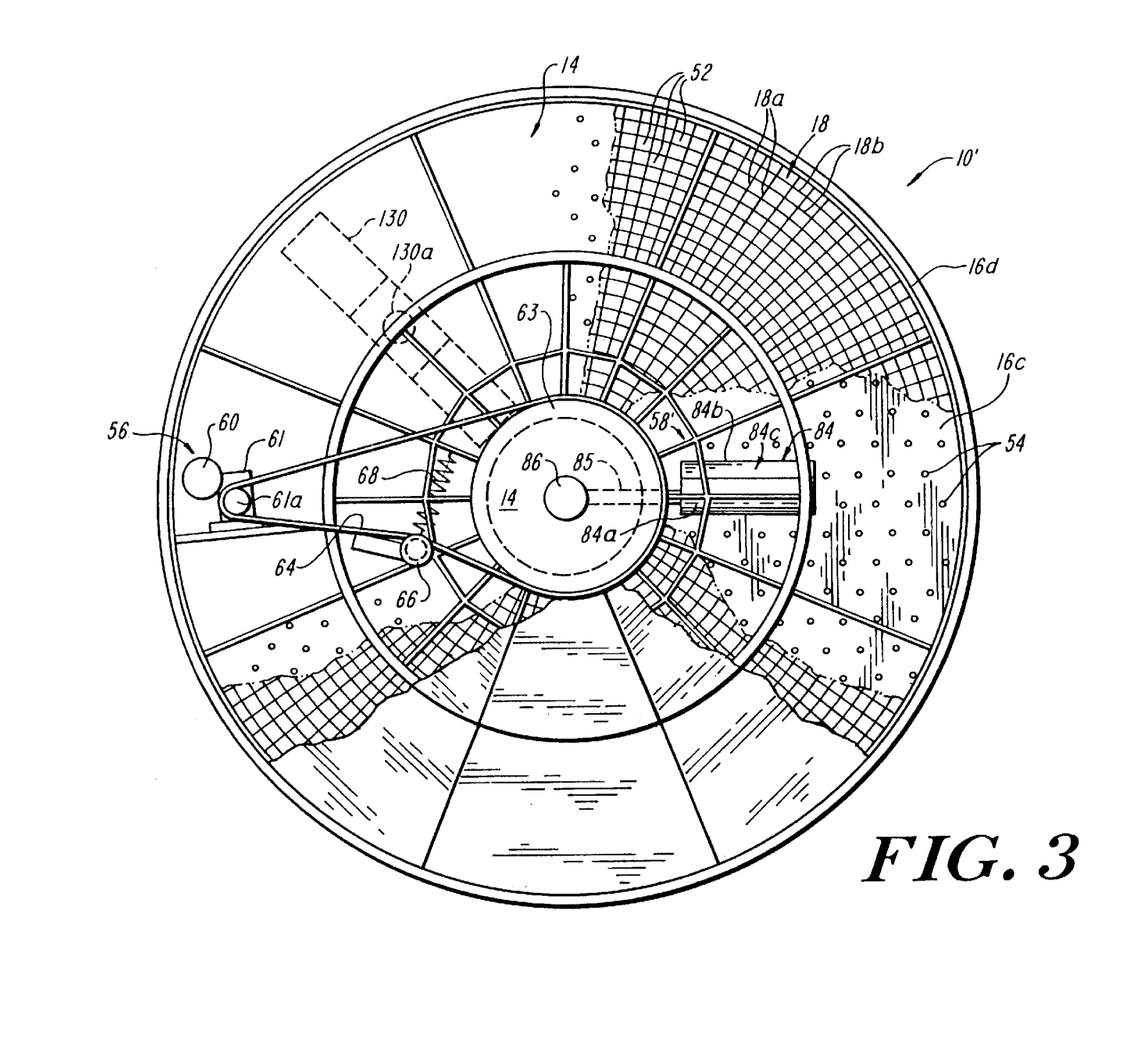
FIG. 3 is a top plan view corresponding to FIG. 1 with an alternative sludge removal system.

The upper support and bearing assembly 72 includes a bearing assembly 72a, engaged between the shaft 70 and a mounting bracket secured to the cover assembly flange 16e'''. The floor 16c of the tank 16 also includes a sump 130 formed in one radial sector, as is best seen in FIGS. 1 and 3. The lamellae 18 preferably mount a flexible scraper 129 that extends radially over the bottom wall 16c and sweeps any particulate which have not been floated to the sludge layer into the sump for periodic disposal via a discharge port 130a.

The sludge removal system 58 shown in FIGS. 1 and 2 mounts four flexible paddles 78 on four arms of each secured at one end, directly or indirectly, to the rotating shaft 70. The paddles preferably extend, as shown, radially over the upper surface of the tank 16, from the wall 15 to the outer edge of the cover assembly 16e. Vertically they each extend from the associated arm 80 downwardly to the normal operating level L of the water in the clarifier. Preferably, as shown, they extend slightly below the surface. As the paddles rotate, they push the sludge layer to rotate with them. The paddles are preferably formed of rubber fixed on the arms 80.

As the paddles rotate, they sequentially engage a fixed ramp 81 mounted in the clarifier and extending radially across the tank 16. The ramp is generally rectangular and is inclined from a radially-extending, leading, lower edge 81a that is typically in the water below the sludge layer to a following upper edge 81b that is above the surface of the water. As the paddle rotate, each paddle in turn pushes the sludge layer ahead of it up the ramp until it falls off the upper edge 81b into an entrance opening 82a in a radially directed sludge discharge pipe 82. The pipe 82 is preferably itself inclined so that the sludge in the pipe slides under the force of gravity away from the tank 16 for collection in a tank 128 (FIG. 5), or other disposal, e.g., directly in a positive displacement pump. The discharge pipe 82 penetrates, but is preferably sealed to, the cover assembly 16e. Rotation of the paddles thus continuously removes the floated sludge layer. Because the mass of the paddle assembly is small compared to that of conventional rotating blade scoop and scoops with a screw conveyors, the power required for its operation is correspondingly low. At steady state, the major power requirement is to overcome frictional losses, to lift a sludge mass up the ramp, and to flex the paddles as it progresses over the ramp—its vertical position being fixed by its attachment to one of the vertically fixed, rigid arms 80. The flexibility of the paddles is limited, however, by the stiffness required to advance a mass of wet sludge up the ramp.

FIGS. 3 and 4 illustrate an alternative sludge removal system 58' which uses a positive vacuum pump 88 to suck sludge collected in a hollow suction scoop 84 and advance it via a tubular arm 85 to a hollow drive shaft portion 70', a rotating joint 86, and a sludge discharge conduit 82'. The suction scoop includes a hollow housing 84a, a forward extending lip 84b leading to an opening 84c in the housing, and a support frame 84d mounted between the moving side wall 15 at its upper portion and the trailing side of the suction scoop housing. The lip 84b has its leading edge positioned to slide just under the floating sludge layer ahead of it. Rotation of the suction head, in cooperation with the suction, causes the sludge scoop via the opening 84c.

With reference to FIG. 5, an air compressor 90 produces a supply of pressurized air that is fed via line 91 through pressure regulators 92 and 94, needle valve 96, and flowmeter 98 to the compartment 38 to produce the pressurized gas layer 44. A small amount of compressed air is constantly added to the compartment 44. The liquid level is controlled by an air bleed valve 100 to atmosphere, shown schematically. The pump 90 also feeds compressed air via line 102, valve 104, and flowmeter 106 to the air dissolving tube (ADT) 47, and via line 108 to the valves 46 to provide operating power applied in coordination with control signals from a timer/controller (not shown). The valves 46 are vented to atmosphere. A suction line 110 feeds clarified water 40 from the compartment 38 to a pressure pump 112. Pressurized water from the pump 112 flows in line 114 to the air dissolving tube 47. A pressure gauge 118 connected in parallel across the inlet and outlet of the ADT 47 measures the differential pressure produced by the inlet nozzle in the ADT. Such pressure difference indicates the flow volume of the recycled water. Line 120 conveys a supply of pressurized water with air dissolved in it to the valves 46.

In the main clarified water effluent outlet line 24, a pump 122 can be used if gravity withdrawal is not possible. A level sensor/transmitter 124 mounted on the tank 16 senses the water level in the tank 16. A level controller 126 receives the output signal of the transmitter 124 and produces corresponding control signals to the automatic valve 42. The controlled operating level of the water in the clarifier is shown at L. FIG. 5 also shows a gravity flow along sludge conduit 82 to the collection tank 128.

By the way of illustration, but not of limitation, the clarifier 10, 10' with a twelve foot (3.69 m) diameter tank 16 has a three foot (0.92 m) diameter flocculator 14. The tank side wall 16d extends twenty inches (51.2 cm) from the bottom plate 16c to the cover assembly 16e, which itself has a maximum height of about two feet (0.61 m) from the upper edge of the side wall. The collection compartment has a height of about eight and a half inches (21.8 cm). The holes 54 are 9/32 inch (0.72 cm) in diameter uniformly spaced six inches (15.3 cm) center-to-center over the bottom wall 16c.

The drive includes a five HP, 1700 rpm motor 60 with a 150:1 gear reduction. The belt 64 introduces a 7.85:1 reduction due to the differences in the diameter of the pulleys 61a and 63. A 3:1 variable frequency controller can vary the output speed of the shaft 70 and connected drive components from 0.48 rpm to 1.44 rpm. The belt is plastic.

A typical total operating inflow rate for the clarifier detailed above is 600 gpm. The compressed air to the space 64 is supplied at a typical value of 100 psi. 10–60% (typically 25%) of the clarified outlet flow is recycled via the tank 26 in order to keep the hydraulic load constant to enhance clarification efficiency.

In operation a supply of raw water from inlet conduit 30 is held in the tank 26 where it is mixed with clarified water being recycled. The percentage recycle flow varies with the variation of raw water flow. The pump 28 supplies the raw, treated water to the flocculator where the valves 46 release streams of microscopic air bubbles. First clarification occurs directly in the flocculator together with degassing. Turbulence associated with introducing the raw water flocculating it, and treating it with air bubbles is substantially confined to, and dissipated in, the flocculator.

The compressor 90 supplies compressed air to create the air layer 44, produce the pressurized air for the ADT 47 and to operate the valves 46. The water level in the compartment 38 is controlled by the gas bleed being on or off. Gas (air) feed into the compartment 38 is preset to a constant metered flow. If more water is processed through the clarifier, the water level in the compartment 38 falls because the level regulator 126 opens the outlet valve 42. This opens the gas bleed of valve 100. The gas pressure in compartment 38 falls and allows the increased flow through the holes. The gas pressure in the compartment is thus set automatically to balance the flow through the holes 54 with the flow through the valve 42.

Depending on the amount of sludge produced and its rate of production, the speed of rotation of the sludge removal system is set accordingly.

Based on prototype testing, it has been found that the clarifiers 10, 10' produce a clarification rate of 6 GPM/SQFT/ (240 liters/min/M$^2$) versus a rate of 3.45 GPM/SQFT (130 liters/min/$^2$) for a "Supracell" brand clarifier, a 1.75 times increase. This performance compares favorably with the theoretical limit of 7.5 GPM/SQFT$^2$ (300 l/min/m$^2$). This rate difference translates into a significant improvement in treatment capacity for comparably sized units (same clarifier tank surface area). Based on known "Supracell" clarifier capacities, and multiplying those capacities by 1.75, clarifiers of the present inventions have capacities as follows:

| Diameter (feet) | GPM | m$^3$/min |
| --- | --- | --- |
| 6 | 150 | 0.57 |
| 8 | 259 | 0.98 |
| 10 | 460 | 1.75 |
| 20 | 1,681 | 6.39 |
| 30 | 3,697 | 13.91 |
| 40 | 6,720 | 25.55 |
| 55 | 12,757 | 48.47 |
| 70 | 30,562 | 78.52 |

The clarifier 10, 10' of the present invention with a six foot tank (1.85 m) diameter has a total water volume in normal operation of 700 gallons, compared to 500 gallons for an eight foot diameter "Supracell" clarifier. The water head is greater and therefore the retention time is longer than with the "Supracell" clarifier 4.6 minutes versus 3.4 minutes. This increase in retention time is believed to be more than offset by the increased efficiency and compactness of the present invention. As to total weight, the increase in water volume is offset in part by the use of light weight materials, aluminum and plastic instead of steel, and by the elimination of the massive carriage of the "Supracell" clarifier which carried motors and a rotatable, multi-bladed scoop. The drive as a whole is much lighter since it must rotate only the top sludge scrapers or suction head and the submerged lamellae.

For periodic cleaning, removal of the cover assembly leaves the flocculator and tank readily accessible from the top. The lamellae can be fabricated in sections for case of removal and cleaning. Coarse impurities that settle in the tank are collected in the sump 130 which can be periodically discharged as in the current "Supracell" clarifier operation. The clarifier 10, 10' can also be periodically purged through a controlled program of adjusting the water level.

Because there is no scoop rotating around over the tank, the clarifier 10, 10' can be covered to enclose the fluids being clarified. It can therefore readily operate with any gas or liquid. Depending on the application, the clarifier with the cover can be operated in an explosion proof manner for use in the petroleum industry, especially refineries.

To conserve power, it is also possible to operate the clarifier 10, 10' intermittently, whereas the carriage of the "Supracell" and like clarifiers needs to be constantly in motion. Intermittent operation allows some thickening of the floated sludge layer, but by selecting the interval and duration of passes, sludge removal can still be effective. Cessation of rotation totalling fifteen minutes for each hour of operation is considered feasible. Continuous rotation of the lamellae is also not essential. Intermittent rotations is sufficient to control channeling and to clear coarse particulate build up on the tank bottom wall 16c.

Clarified water removal through shallow air pocket allows uniform removal over the entire tank bottom with a minimum of resistance to an outlet flow. The sump scraper 129 can also clear the outlet apertures 54.

Viewed as a process, the present invention sequentially clarifies a flow of treated raw water in a flocculator zone I (where excess air is released and the water is calmed) and two vertically adjacent zones II (where a pre-clarification occurs) and III (where final clarification occurs) in fluid communication with the flocculator and each other, but substantially isolated from turbulence in the flocculator. Quiet zone III clarification involves locking columns of treated water in a open-ended channels. Clarified water removal includes the step of gravity feeding clarified water from zone III through an array of apertures and through an underlying pressurized gas pocket. Sludge removal steps include pushing a floated sludge layer up a ramp for a radially directed removal from the clarifier, preferably by gravity feed. Alternatively, the sludge removal is a combination of a mechanical skimming and a positive suction along a rotating radial line which repeatedly sweeps the upper surface of zone II to remove the floated sludge layer.

There has been described a clarifier and clarification process which is compact and operates at a highly increased clarification rate and capacity compared to a like-sized, single stage (clarification, no filtration) DAF clarifier and processes. The present invention provides an almost 75% increase in capacity per square foot (6 GPM/sq.ft. versus 3.45 GPM/sq. ft. for a "supracell" clarifier) over the most commonly used "zero-velocity" DAF clarifier and an almost 300% increase in capacity per square foot over the "sedifloat" one stage, single tank DAF clarifier. The clarifier and process of this invention reduce the weight of moving parts, particularly the sludge removal apparatus, and thereby reduce the power required for operation.

The clarifier and process of the present invention also lend themselves to the use of low-weight materials and low cost fabrication techniques. Clarification is generally continuous; operation of moving components can be intermittent. The clarifier and process can be enclosed to process fluids and use gases which are toxic, highly volatile, flammable, or even explosive. Level control, periodic purging, and cleaning of internal components are all performed readily.

While the invention has been described with respect to its preferred embodiments, various modifications and alterations will occur to those skilled in the art from the foregoing detailed description and the accompanying drawings. For example, while zone III has been described with reference to one type of construction to produce an annular array of moving channels, other construction are possible, such as a fixed array, an array of only conical (concentric) plates, and array of only generally radial plates that are vertical or inclined, or other more complex, e.g. curvilinear or undulating plate or assemblies. These construction are possible alternatives, provided that they produce the desired final slow clarification and that do not produce an unacceptable degree or rate of build up either in or adjacent the lamellae. Reduced performance or increased costs, both of materials and of fabrication, are considered drawbacks of such alternative constructions.

The clarifiers 10, 10' have been described herein as having ring-like tanks with a central flocculator separated by a moving, generally cylindrical wall. While this construction is preferred, other geometries are possible, albeit with anticipated reductions in performance or increases in manufacturing and or operating cost. For example, the tank could be rectilinear, as in U.S. Pat. No. 5,268,099, with a flocculator or flocculators positioned in the tank for the sequential flows described herein. The flocculator wall could be fixed, with the lamellae drive transmitted via a separate mechanical connection. The upper openings 15b in the flocculator wall could also assume a variety of configurations, locations and designs, e.g. conduits or directed vanes mounted in the wall, or a castellated upper edge of the flocculator wall which has vertical flow-through slots extending to the upper edge. Regardless of the precise mechanical implementation, the turbulence of the first clarification and degassing should be substantially isolated in the flocculator and there should be a smooth flow, of sufficient volume and at a sufficient rate, to produce the desired clarification action in zones II and III of the tank.

While the invention has been described with respect to two forms of sludge removal, others can be used, again with some expected loss of advantages stated herein. For example, paddles could be stiff, hinged, and spring-loaded to pass over the ramp. Or the support arm itself can flex or have a spring-loaded torsional movement.

The clarifier 10, 10' could be operated to some advantage without the gas layer 44, but a direct and significant decrease in performance would be expected.

While operation with a cover is a significant advantage of this invention, again, other advantages are still available if a cover is not used. Similarly, while a particular an offset drive is described, those skilled in the art will readily perceive that there are myriad power source and power transmission arrangements for generating a rotary motion of the sludge removal system and the lamellae. For example, a direct overhead drive by a centrally mounted motor and variable speed gear transmission is possible.

These and other modification and variations are intended to fall within the scope of the appended claims.

What is claimed is:

1. A process for clarifying raw water by dissolved air flotation comprising the steps of:

treating a flow of the raw water in a first zone with a flocculating agent and a stream of microscopic air bubbles to produce a first flotation clarification and a degassing and calming of the water, directing treated water and from said first zone following said flotation clarification to a second zone where a second flotation clarification occurs, further sequentially clarifying the water from said second zone in a third zone underlying, and in fluid communication with, said second zone, said third zone clarifying including locking the water being clarified in an array of inclined, open-ended channels, rotating said array of inclined, open-ended channels, isolating said second and third zones from turbulence in said first zone, and removing a floating sludge of flocculated contaminates produced by said first, second and third zone clarifying.

2. The process of claim 1 wherein said rotating is in unison with said sludge removing.

3. The process of claim 1 further comprising removing clarified water from said third zone by gravity discharging through a layer of pressurized gas.

4. The process of claim 3 further comprising the step of regulating the water level during said clarifying process and collecting said clarified water in a compartment underlying said layer of pressurized gas.

5. The process of claim 4 wherein said regulating comprises monitoring the water level in said second zone and said compartment, controlling the outlet of said clarified water from said compartment in response to said monitoring of said second zone water level, and controlling the clarified water level in said compartment in response to said monitoring of said clarified water level in said compartment.

6. The process of claim 5 wherein said clarified water level controlling comprises continuously adding pressurized gas to said gas layer, and bleeding off gas from said pressurized layer in response to said clarified water level monitoring.

7. A process for clarifying raw water by dissolved air flotation comprising the steps of:

treating a flow of the raw water in a first zone with a flocculating agent and a stream of microscopic air bubbles to produce a first flotation clarification and a degassing and calming of the water, directing treated water from said first zone following said flotation clarification to a second zone where a second flotation clarification occurs, further sequentially clarifying the water from said second zone in a third zone underlying, and in fluid communication with, said second zone, said third zone clarifying including locking the water being clarified in an array of inclined, open-ended channels, isolating said second and third zones from turbulence in said first zone, removing a floating sludge of flocculated contaminants produced by said first, second and third zone clarifying; and removing clarified water from said third zone by gravity discharging through a layer of pressurized gas.

8. The process of claim 7 further comprising the step of regulating the water level during the clarifying process and collecting the clarified water in a compartment underlying said layer of pressurized gas.

9. The process of claim 8 wherein said regulating comprises;

monitoring the water level in said second zone and said compartment, controlling the outlet of said clarified water from said compartment in response to said monitoring of said second zone water level, and controlling the clarified water level in said compartment in response to said monitoring of said clarified water level in said compartment.

10. The process of claim 9 wherein said clarified water level controlling comprises continuously adding pressurized gas to said gas layer, and bleeding off gas from said pressurized layer in response to said clarified water level monitoring.

* * * * *